(12) United States Patent
Sato et al.

(10) Patent No.: US 9,606,298 B2
(45) Date of Patent: Mar. 28, 2017

(54) OPTICAL CONNECTOR

(71) Applicant: HIROSE ELECTRIC CO., LTD., Tokyo (JP)

(72) Inventors: Takuya Sato, Tokyo (JP); Shinichi Matsumoto, Tokyo (JP); Yoshiyuki Hiyama, Tokyo (JP)

(73) Assignee: HIROSE ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/209,305

(22) Filed: Jul. 13, 2016

(65) Prior Publication Data

US 2017/0017046 A1  Jan. 19, 2017

(30) Foreign Application Priority Data

Jul. 16, 2015 (JP) .................................. 2015-142117

(51) Int. Cl.
*G02B 6/36* (2006.01)
*G02B 6/38* (2006.01)

(52) U.S. Cl.
CPC .................................. *G02B 6/3821* (2013.01)

(58) Field of Classification Search
CPC ...................................................... G02B 6/3821
USPC ............................................................. 385/78
See application file for complete search history.

(56) References Cited

U.S. PATENT DOCUMENTS

2015/0338581 A1* 11/2015 Hikosaka ............. G02B 6/3887
385/83

* cited by examiner

*Primary Examiner* — Jerry Blevins
(74) *Attorney, Agent, or Firm* — Rankin, Hill & Clark LLP (57) ABSTRACT

As a cylindrical optical connector, an optical connector includes a pushing member that has a structure that is suitable for holding a coil spring in the optical connector, and that has a structure that, even if clockwise or counterclockwise twisting occurs with respect to an axial direction of the optical connector, properly restricts rotation of the pushing member and, thus, does not allow disengagement of the pushing member caused by an applied force resulting from the rotation of the pushing member to easily occur.

6 Claims, 8 Drawing Sheets

OPTICAL CONNECTOR

BACKGROUND OF THE INVENTION

1. Field of the Invention

The present invention relates to an optical connector. More specifically, the present invention relates to a structure of a component for mounting an elastic member, such as a coil spring, in the optical connector to, when optical connectors are connected to each other, maintain a state in which a ferrule of one of the connectors and a ferrule of the other optical connector are physically pushed against each other, and keep optical fibers optically coupled to each other, the elastic member applying a force that at least causes the ferrule of one of the optical connectors to push the ferrule of the other optical connector at all times.

2. Description of the Related Art

An existing optical connector of a type that optically couples optical fibers to each other by inserting a guide pin protruding from an end surface of a ferrule of the optical connector into a guide hole in an end surface of a ferrule of a mating optical connector, by positioning the ferrules with respect to each other, and by physically pushing the ferrule end surfaces against each other is available. In order to keep the ferrule end surfaces pushed against each other at all times, such an optical connector includes an elastic member, such as a coil spring, therein. The elastic member, such as a coil spring, is formed so as to push out the ferrule in a front end direction. By an elastic force (an urging force), the elastic member, such as a coil spring, allows the ferrule end surface to be pushed against the ferrule end surface of the mating optical connector at all times.

For example, a rectangular optical connector described in Japanese Patent No. 5518979 has a structure in which movement towards a back end side of a spring (coil spring) that urges a ferrule from a back end side to a front end side is restricted by a pushing member (spring pusher) to push out the ferrule in a front end direction. The spring pusher is a rectangular pushing member including bent sections that are vertically bent at two respective sides. By engaging retaining lugs protruding from outer surfaces of the bent sections at the two respective sides with engaging sections in inner surfaces at two respective sides of the housing (receptacle housing) of the optical connector, the spring pusher is fixed to the housing of the optical connector.

As in the related art described above, if an optical connector is a rectangular optical connector, the retaining lugs on the outer surfaces of the bent sections of the rectangular pushing member, such as the above-described spring pusher, at the two respective sides can firmly engage with the engaging sections in the inner surfaces at the two respective sides of the housing of the optical connector. However, if an engaging structure including retaining lugs and engaging sections such as that of the related art is applied to a cylindrical optical connector, the retaining lugs and the engaging sections need to be formed in accordance with the curved surface of the housing of the cylindrical optical connector, as a result of which it is troublesome to produce the optical connector compared to the optical connector of the related art. Therefore, this engaging structure is not a structure that is suitable for the cylindrical optical connector.

In addition, if the housing of the cylindrical optical connector to which an engaging structure such as that of the related art is applied is twisted clockwise or counterclockwise with respect to an axial direction, rotation generated by the twisting of the housing is restricted only by the engaging structure including the retaining lugs and the engaging sections. This causes a force that is generated by the rotation to concentrate in the engaging structure, as a result of which the pushing member and the housing of the optical connector are disengaged from each other. This may cause the optical connector to become disassembled.

SUMMARY OF THE INVENTION

Accordingly, it is an object of the present invention to provide, as a cylindrical optical connector, an optical connector including a pushing member that has a structure that is suitable for holding a coil spring in the optical connector, and that has a structure that, even if clockwise or counterclockwise twisting occurs with respect to an axial direction of the optical connector, properly restricts rotation of the pushing member and, thus, does not allow disengagement of the pushing member caused by an applied force resulting from the rotation of the pushing member to easily occur.

According to an embodiment of the present invention, there is provided an optical connector including a ferrule that is connected to an optical fiber cable; a fitting section that holds a front end portion of the ferrule therein and that is fitted to a mating optical connector; an elastic member that is disposed at a back end portion of the ferrule; an accommodation section that accommodates the ferrule and the elastic member therein; and a pushing member that pushes the elastic member into the accommodation section and that is mounted in the accommodation section. In the optical connector, the accommodation section includes a retaining section that protrudes from an inner wall of the accommodation section. In addition, the pushing member includes a lock section for receiving the retaining section. Further, when the pushing member is mounted in the accommodation section, the lock section is fixed by being pushed against the retaining section by an elastic force of the elastic member accommodated in the accommodation section.

According to a preferred embodiment of the present invention, in the optical connector, the pushing member may include a cutaway section that is formed by cutting out a portion of a side wall of the pushing member, and the cutaway section may be formed such that, when mounting the pushing member in the accommodation section, the retaining section and the cutaway section are aligned and the pushing member is pushed into the accommodation section to pass the retaining section through the cutaway section.

According to another preferred embodiment of the present invention, in the optical connector, the pushing member may include a lock protrusion that protrudes from an edge of the lock section facing the cutaway section; the lock protrusion may be formed so as to, when mounting the pushing member in the accommodation section, traverse the retaining section as a result of the retaining section passing through the cutaway section and the pushing member rotating from a state in which the pushing member contacts a surface in the accommodation section; and, after the pushing member is mounted in the accommodation section, the lock protrusion may come into contact with the retaining section to restrict rotation of the pushing member.

According to still another preferred embodiment of the present invention, in the optical connector, the pushing member may include a concave-shaped jig receiver that, when mounting the pushing member in an end portion of the accommodation section, receives a jig for rotating the pushing member.

According to still another preferred embodiment of the present invention, in the optical connector, the pushing member may include a recessed section in a surface of the pushing member that contacts the elastic member, and the recessed section may hold an end portion of the elastic member and restrict displacement of the elastic member.

Unlike the above-described related art, the optical connector according to the present invention includes an engaging structure that is suitable for a cylindrical shape. Accordingly, even if clockwise or counterclockwise twisting occurs with respect to the axial direction of the optical connector, the retaining section that is formed on the inner wall of the accommodation section of the optical connector and the lock protrusion of the pushing member can restrict the rotation of the pushing member of the optical connector generated by the twisting, and, thus, prevent the pushing member from being removed from the accommodation section of the optical connector.

DESCRIPTION OF THE PREFERRED EMBODIMENTS

An embodiment of the present invention is hereunder described with reference to the drawings. In all of the figures for illustrating the embodiment, as a general rule, corresponding members are given the same reference numerals, and the same descriptions thereof are not repeated.

Figure 1:
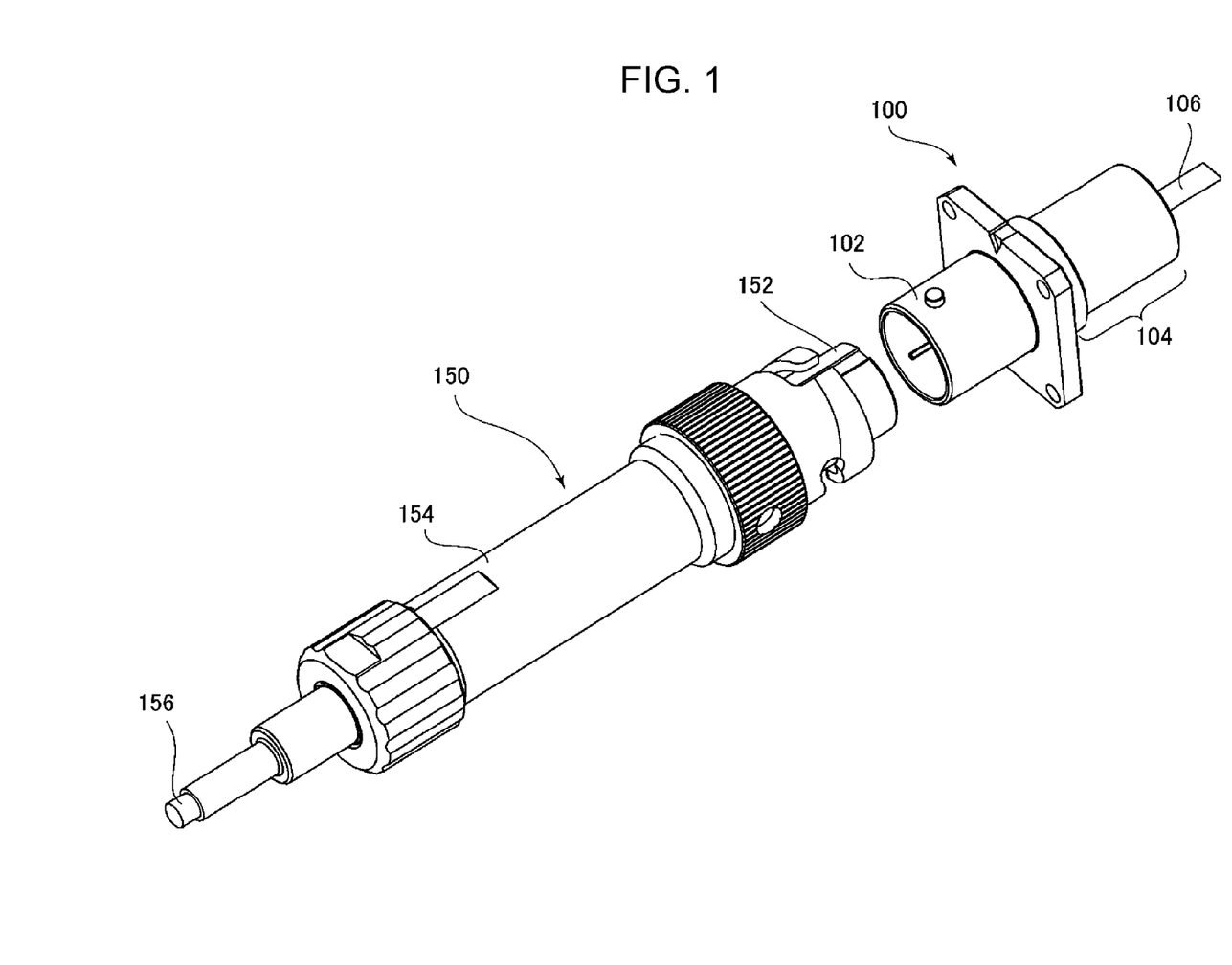
FIG. 1 is an external view of an optical connector according to an embodiment of the present invention and a mating optical connector.

FIG. 1 is an external view of an optical connector according to the embodiment of the present invention and a mating optical connector. A cylindrical optical connector 100 corresponds to the optical connector according to the embodiment of the present invention. The optical connector 100 includes at its front end portion a cylindrical fitting section 102 for connecting a mating optical connector 150 thereto. The optical connector 100 includes at its back end portion a cylindrical accommodation section 104 for accommodating a pushing member 200, a coil spring 202, and a ferrule 204 coupled to an optical cable 106 (see FIG. 3), which are described below.

The cylindrical mating optical connector 150 includes at its front end portion a fitting section 152 that is fitted to the fitting section 102 of the optical connector 100 to optically couple an optical cable 156 and the optical cable 106 to each other. At a side that is situated closer to a back end than the fitting section 152 is, the mating optical connector 150 includes a cord tube 154 that accommodates the optical cable 156 therein. The optical cable 156 extends from a back end portion of the cord tube 154.

Figure 2:
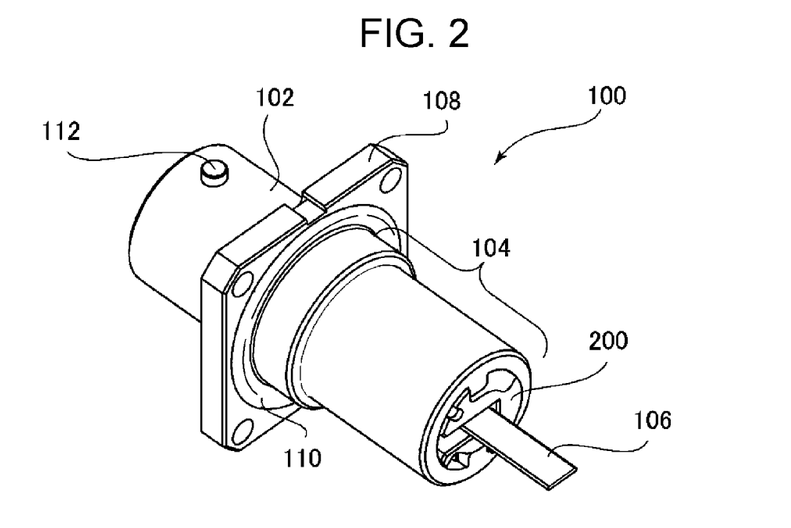
FIG. 2 is an external view of the optical connector according to the embodiment of the present invention.

FIG. 2 is an external view of the optical connector according to the embodiment of the present invention. As described above, the optical connector 100 includes the fitting section 102 at its front end portion, and the accommodation section 104 at its back end portion. The optical cable 106 extends from a back end portion of the accommodation section 104. A flange section 108 for mounting the optical connector 100 on a housing of, for example, a device is provided between the fitting section 102 and the accommodation section 104. Water-proof packing 110 for preventing entry of water from a gap between the housing and the flange section 108 when the optical connector 100 is mounted on the housing of, for example, the device is provided on a surface of the flange section 108 that contacts the housing (a surface at a side of a back end of the optical connector 100). The fitting section 102, the accommodation section 104, and the flange section 108 are integrated with each other by die casting. A lock protrusion 112 for fixing the fitting and connection with the fitting section 152 of the mating optical connector 150 is provided on an outer wall of the fitting section 102. The columnar or disc-shaped pushing member 200 is mounted in an end portion of the accommodation section 104 of the optical connector 100.

Figure 3:
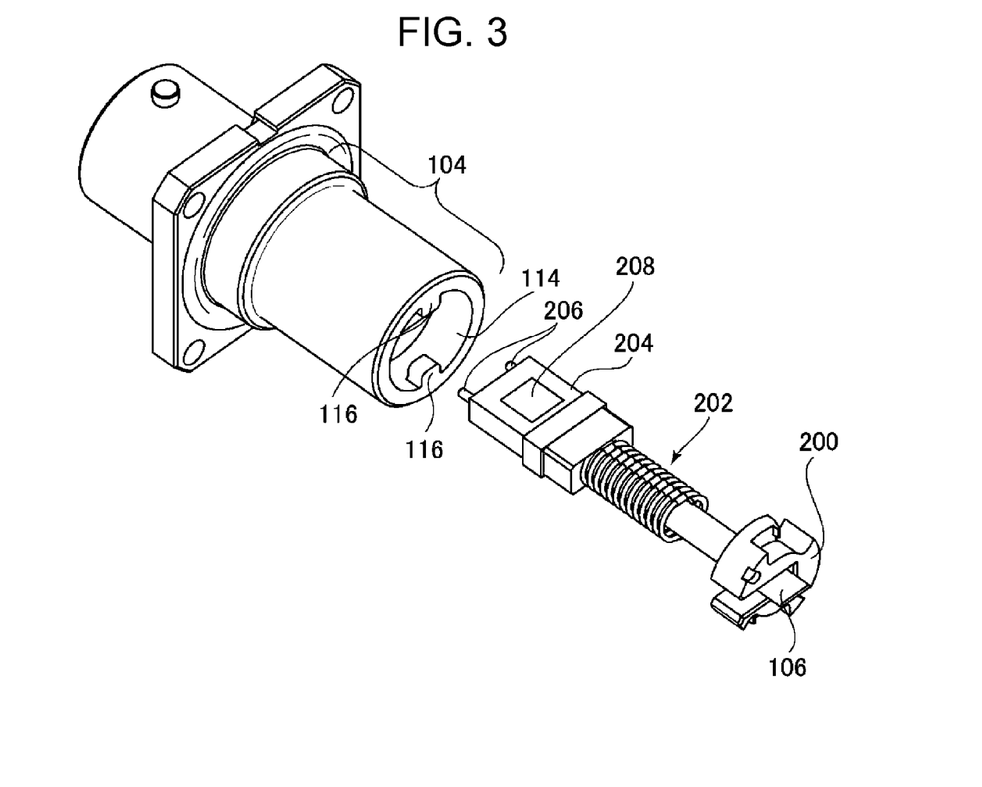
FIG. 3 shows a structure of components of the optical connector according to the embodiment of the present invention.

FIG. 3 illustrates a structure of components of the optical connector according to the embodiment of the present invention. An inner side of the end portion of the accommodation section 104 of the optical connector 100 corresponds to a mounting section 114 for accommodating and mounting the pushing member 200. The mounting section 114 includes retaining sections 116 that protrude vertically from an inner wall of the end portion of the accommodation section 104. In the embodiment shown in FIG. 3, two retaining sections 116 are provided. The two retaining sections 116 are provided at opposite locations on the cylindrical mounting section 114. That is, in the cylindrical mounting section 114, one of the retaining sections 116 is provided at a location that faces and that is 180 degrees apart from the other retaining section 116. The number of retaining sections 116 is not limited to two. The accommodation section 104 accommodates, in addition to the pushing member 200, the coil spring 202 and the ferrule 204 coupled to the optical cable 106. In another embodiment, instead of the coil spring 202, other elastic members may be used as long as the elastic members are capable of pushing the ferrule 204 in a front end direction.

The ferrule 204 includes at its front end portion a pair of guide pins 206 for preventing shifts in the connection of the ferrule 204 with the mating optical connector. An adhesive 208 for fixing core wires of an optical fiber is applied to a surface of an upper portion of the ferrule 204. When the coil spring 202 and the ferrule 204 to which the optical cable 106 is coupled are accommodated in the accommodation section 104 of the optical connector 100, and the pushing member 200 is mounted in the end portion (the mounting section 114) of the accommodation section 104 against an elastic force of the coil spring 202, the coil spring 202 is compressed by being pushed into a location between the ferrule 204 and the pushing member 200, so that the ferrule 204 is urged at all times in the front end direction of the connector 100 (that is, in the direction of the mating optical connector) (refer to FIG. 4).

Figure 4:
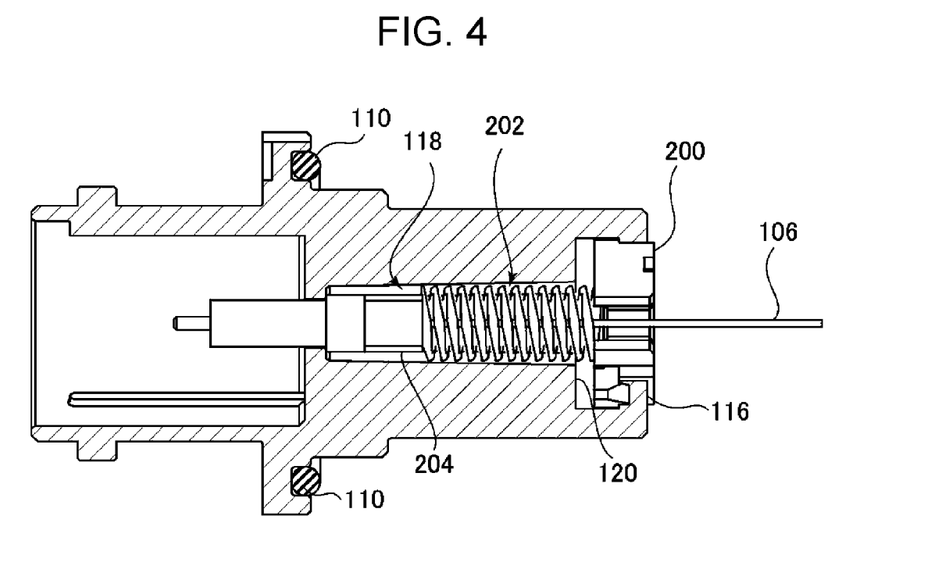
FIG. 4 is a sectional view of the optical connector according to the embodiment of the present invention.

FIG. 4 is a sectional view of the optical connector according to the embodiment of the present invention, and shows a state in which the ferrule 204 is urged at all times in the front end direction of the optical connector 100 by urging the coil spring 202 by the pushing member 200. An accommodation space 118 for accommodating the ferrule 204, the coil spring 202, and the optical cable 106 is formed in the accommodation section 104. The ferrule 204 is formed so as to be slidable in the accommodation space 118 in the front end direction or the back end direction. As shown in cross section in FIG. 4, the accommodation space 118 is narrow towards a front end side and is wide towards a back end side. That is, an inner wall of the accommodation section 104 is formed obliquely in such a manner as to become gradually narrower in the front end direction from a portion where a restricting surface 120 is provided.

The ferrule 204 is urged in the front end direction of the optical connector 100 by the coil spring 202, and comes into contact with an inner wall of a front end portion of the accommodation space 118, so that movement of the ferrule 204 in the front end direction is restricted. When connecting the optical connector 100 to the mating optical connector 150, a ferrule (not shown) in the mating optical connector 150 pushes in the ferrule 204 in the back end direction. However, since the ferrule 204 is subjected to an elastic force of the coil spring 202 at all times, a force that pushes in the ferrule 204 in the front end direction acts upon the ferrule 204. The coil spring 202 not only acts to push in the ferrule 204 in the front end direction of the optical connector 100 but also acts to push out the pushing member 200 in the back end direction.

The restricting surface 120 is provided at a boundary between the mounting section 114 and the accommodation space 118, and can restrict movement of the pushing member 200 in the front end direction when pushing the pushing member 200 into and mounting the pushing member 200 in the mounting section 114.

Figure 5A:
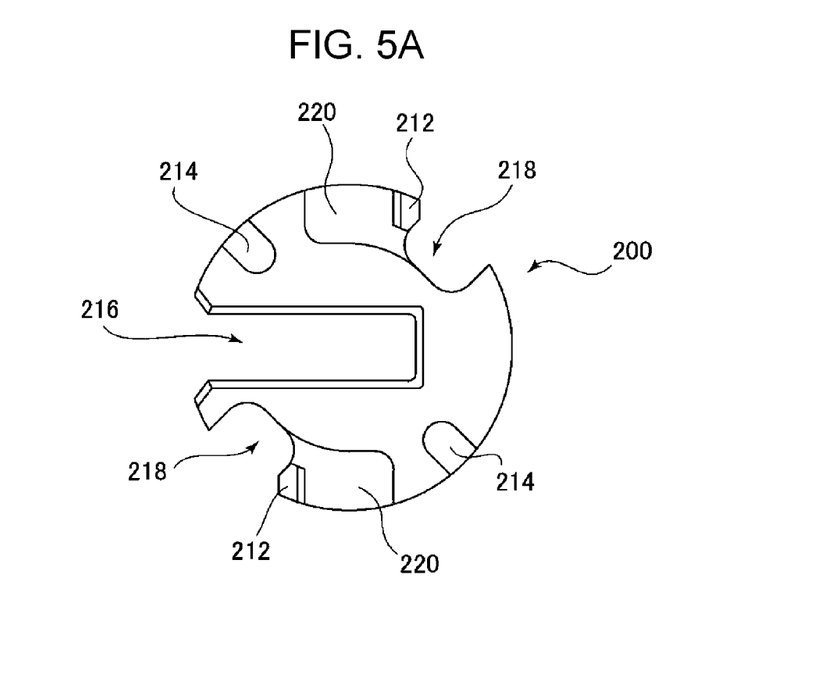
FIGS. 5A to 5C are external views of a pushing member that is mounted in an end portion of an accommodation section of the optical connector according to the embodiment of the present invention.
Figure 5B:
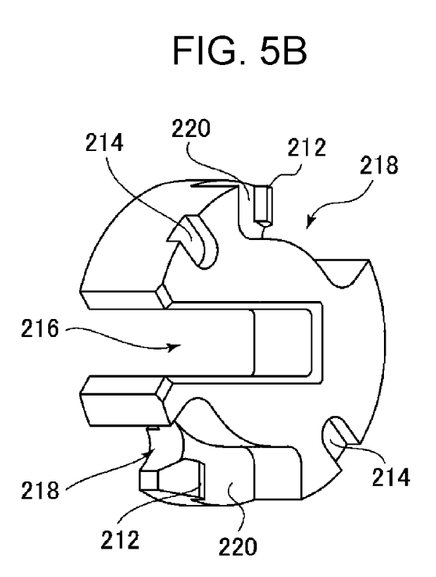
Figure 5C:
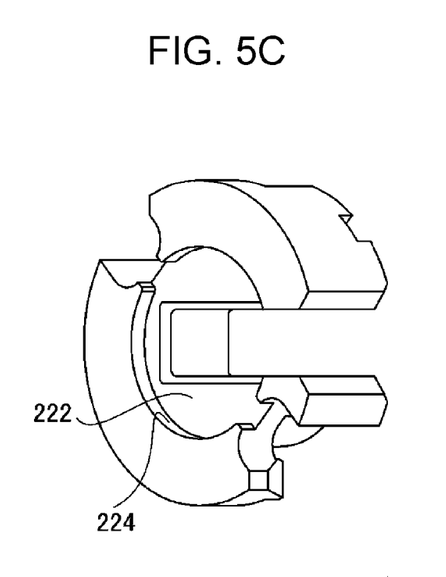

FIGS. 5A to 5C are external views of the pushing member that is mounted in the end portion of the accommodation section of the optical connector according to the embodiment of the present invention. FIG. 5A is a front view of a front surface of the pushing member 200 (a surface at a side of the back end portion of the optical connector 100). Lock protrusions 212, jig receivers 214, a cable holding section 216, cutaway sections 218, and lock sections 220 are provided at the front surface of the pushing member 200. The lock protrusions 212 are formed such that, when the pushing member 200 is mounted in the mounting section 114 of the optical connector 100, the lock protrusions 212 are caught by the retaining sections 116 that are formed on the inner wall of the end portion of the accommodation section 104. The lock protrusions 212 are formed on front surfaces of the respective lock sections 220 formed by reducing the thickness of an edge of the columnar or disk-shaped pushing member 200, and are positioned at ends of the respective lock sections 220 facing the cutaway sections 218 that are formed by cutting out recessed portions from the pushing member 200.

The jig receivers 214 are portions that are located at the edge of the columnar or disk-shaped pushing member 200, and that are formed with concave shapes by cutting the front surface of the pushing member 200 (the surface at the side of the back end of the optical connector 100) and reducing the thickness of the edge. The jig receivers 214 can receive a front end of a jig that is used when accommodating and mounting the pushing member 200 in the end portion (the mounting section 114) of the accommodation section 104 of the optical connector 100. By inserting the front end of the jig into the jig receivers 214, the jig can push the pushing member 200 into the accommodation section 104 of the optical connector 100 and rotate the pushing member 200.

The cable holding section 216 is formed by forming a cut from the edge to the center of the pushing member 200. The width of the cut is approximately equal to a width that allows the optical cable 106 to be held. When mounting the pushing member 200 in the end portion of the accommodation section 104 of the optical connector, the optical cable 106 coupled to the ferrule 204 accommodated in the accommodation section 104 is brought out of the optical connector 100 from the cable holding section 216.

The cutaway sections 218 are formed by cutting out portions of a side wall of the columnar or disk-shaped pushing member 200. The shape of the cutaway sections 218 allows the retaining sections 116 that protrude from the inner wall of the accommodation section 104 to pass therethrough. Therefore, when mounting the pushing member 200 in the end portion of the accommodation section 104 of the optical connector 100, the retaining sections 116 and the cutaway sections 218 are aligned and the pushing member 200 is pushed into the end portion of the accommodation section 104 to pass the retaining sections 116 through the cutaway sections 218.

The lock sections 220 are portions that are formed by cutting the edge of the columnar or disk-shaped pushing member 200 from the front surface of the pushing member 200 and reducing the thickness of the edge of the pushing member 200. When the pushing member 200 is mounted in the end portion of the accommodation section 104 of the optical connector 100, the lock sections 220 are fixed by being pushed against back surfaces of the retaining sections 116 (surfaces towards a front end of the optical connector) by an elastic force of the coil spring 202 accommodated in the accommodation section 104. That is, when the pushing member 200 is mounted in the mounting section 114 in the accommodation section 104, it is possible to restrict rotation of the pushing member 200, which is caused by twisting, by inserting the retaining sections 116 into the lock sections 220 and bringing the lock protrusions 212 on the lock sections 220 into contact with side walls of the retaining sections 116.

FIG. 5B is an external perspective view of the front surface of the pushing member 200. Referring to FIG. 5B, it can be confirmed that the lock protrusions 212 protrude from ends of the respective lock sections 220. In one example of the pushing member 200 shown in FIGS. 5A to 5C, each lock section 220 is formed by cutting the front surface of the pushing member 200 and reducing the thickness thereof to approximately one half of the original thickness.

FIG. 5C is an external perspective view of a back surface of the pushing member 200. The back surface of the pushing member 200 (the surface of the pushing member 200 that contacts the coil spring 202) includes a recessed section 222 and a recessed-section side wall 224. The recessed section 222 is formed by cutting a cylindrical shape from a central portion of the pushing member 200 to have a certain depth. By passing the optical cable 106 inwardly of an inner side of the recessed section 222, the recessed section 222 can hold an end portion of the coil spring 202 that is disposed at a back end of the ferrule 204. If, for example, the coil spring 202 is compressed, the recessed section 222 can restrict displacement of the end portion of the coil spring 202. More specifically, the recessed-section side wall 224, which is a side wall of the recessed section 222, can prevent displacement and movement of the coil spring 202 from the center of the pushing member 200.

Figure 6A:
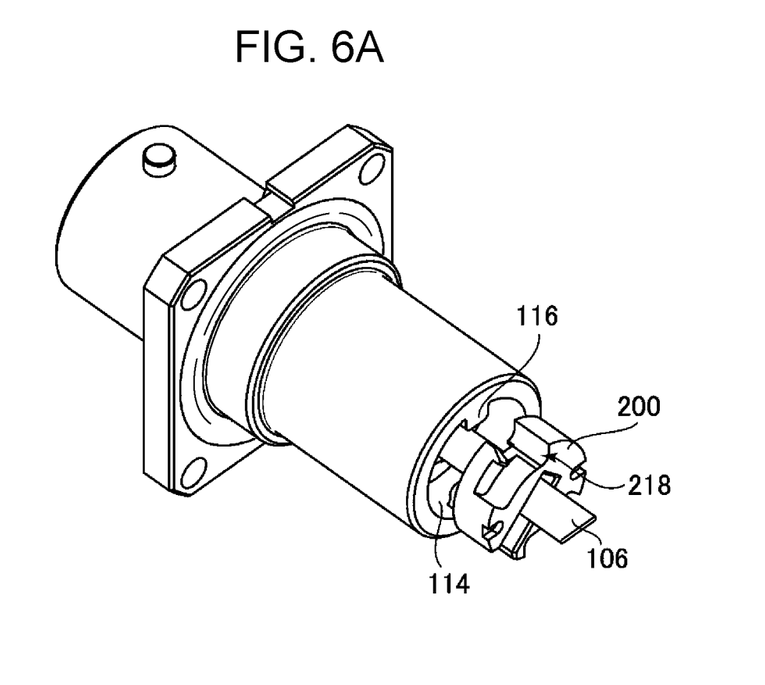
FIGS. 6A and 6B are an external view and a sectional view, respectively, of a state prior to pushing the pushing member into the accommodation section of the optical connector according to the embodiment of the present invention.

FIGS. 6A to 9B are external views and sectional views showing states of respective stages when pushing the pushing member into and mounting the pushing member in the accommodation section of the optical connector according to the embodiment of the present invention. FIGS. 6A and 6B show a state prior to pushing the pushing member 200 into the end portion (the mounting section 114) of the accommodation section 104 of the optical connector 100. Referring to FIG. 6A, the pushing member 200 is held such that the optical cable 106 is passed through the cable holding section 216, the front end of a jig (not shown) is inserted into the jig receivers 214, and the retaining sections 116 and the cutaway sections 218 are aligned.

Figure 6B:
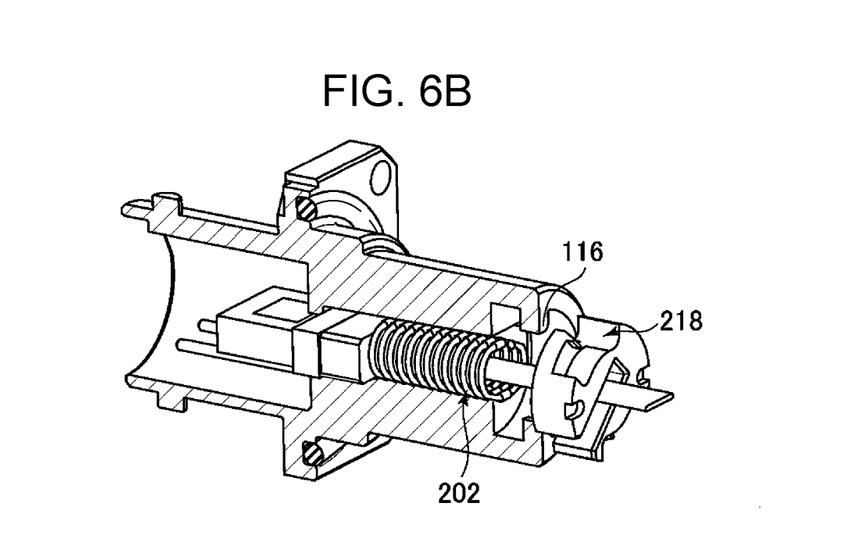

FIG. 6B shows a state of the inside of the accommodation section 104, where the ferrule 204 coupled to the optical cable 106 and the coil spring 202 are accommodated in the accommodation section 104. At this time, a force is not applied to the coil spring 202, and an elastic force does not act.

Figure 7A:
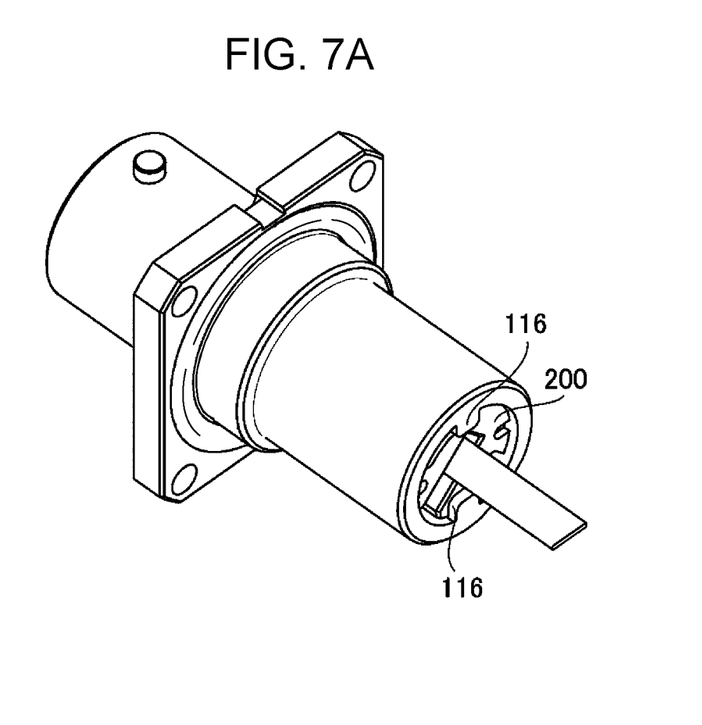
FIGS. 7A and 7B are an external view and a sectional view, respectively, of a state in which the pushing member has been pushed into the accommodation section of the optical connector according to the embodiment of the present invention.

FIG. 7A shows a state in which the pushing member 200 has been pushed to an inner side of the accommodation section 104. By pushing the pushing member 200 into the accommodation section 104, the cutaway sections 218 are aligned with the retaining sections 116 and receive the retaining sections 116 located at the front side, and the retaining sections 116 pass through the cutaway sections 218 and are positioned from a back-surface side to a front-surface side of the pushing member 200.

Figure 7B:
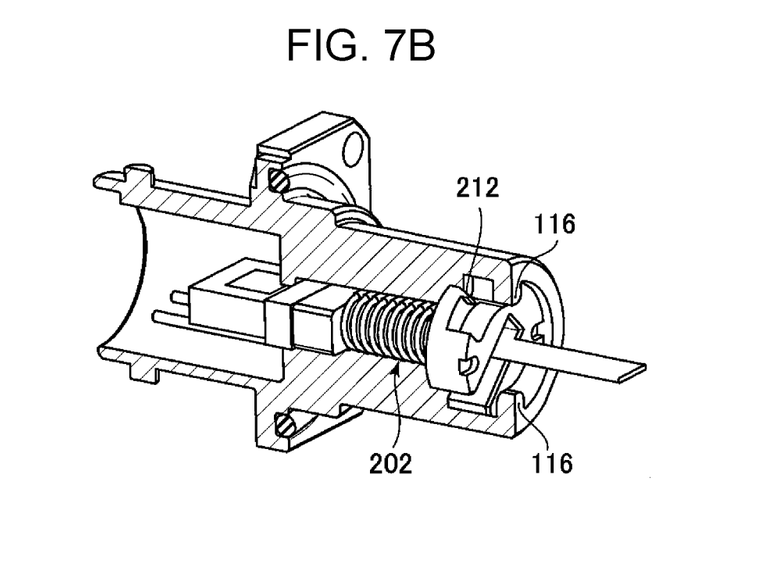

FIG. 7B shows a state of the inside of the pushed-in pushing member 200. When the pushing member 200 is pushed into the accommodation section 104, the back surface of the pushing member 200 comes into contact with the restricting surface 120 that is disposed at the boundary between the accommodation space 118 and the mounting section 114 in the accommodation section 104, so that further pushing of the pushing member 200 into the inner side of the accommodation section 104 is restricted. When the pushing member 200 is pushed into the accommodation section 104 until the pushing member 200 comes into contact with the restricting surface 120, the lock protrusions 212 on the front surface of the pushing member 200 can move around to back sides of the retaining sections 116. By pushing the pushing member 200 into the accommodation section 104, the coil spring 202 is brought into a compressed state.

Figure 8A:
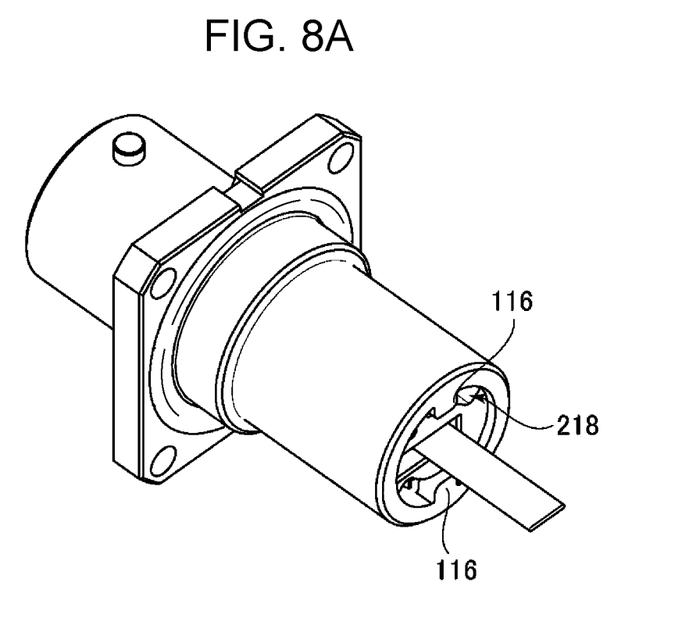
FIGS. 8A and 8B are an external view and a sectional view, respectively, of a state in which the pushing member has been rotated rightward from the state in which the pushing member has been pushed into the accommodation section of the optical connector according to the embodiment of the present invention.
Figure 8B:
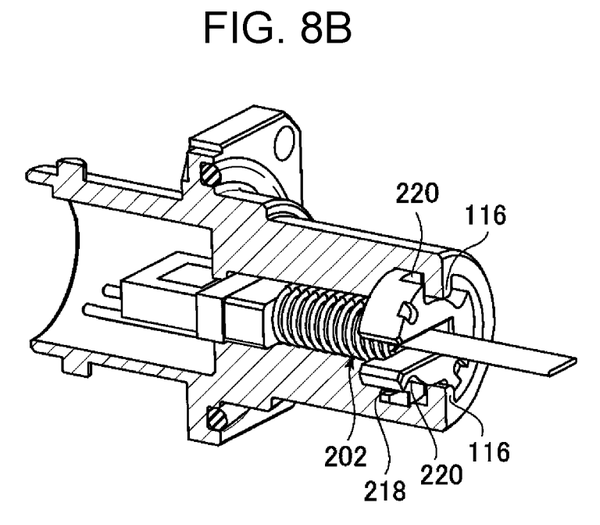

FIGS. 8A and 8B show a state in which the pushing member has been rotated rightwards by a predetermined angle (such as 45 degrees) from the state shown in FIGS. 7A and 7B. Referring to FIG. 8A, the pushing member 200 is rotated rightwards by a jig (not shown) whose front end is inserted in the jig receivers 214. FIG. 8B shows a state of the inside of the accommodation section 104. Referring to FIG. 8B, each lock protrusion 212 traverses the back surface of the corresponding retaining section 116 to move from one side surface of the corresponding retaining section 116 to the other side surface of the corresponding retaining section 116, so that each lock section 220 moves exactly to the position where it opposes the back surface of the corresponding retaining section 116.

Figure 9A:
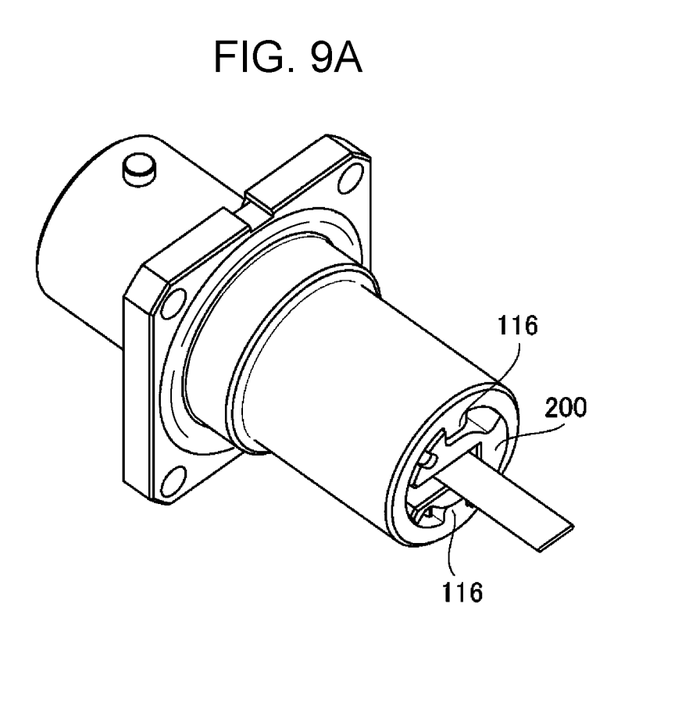
FIGS. 9A and 9B are an external view and a sectional view, respectively, of a state in which the pushing member has been mounted in the end portion of the accommodation section of the optical connector according to the embodiment of the present invention.
Figure 9B:
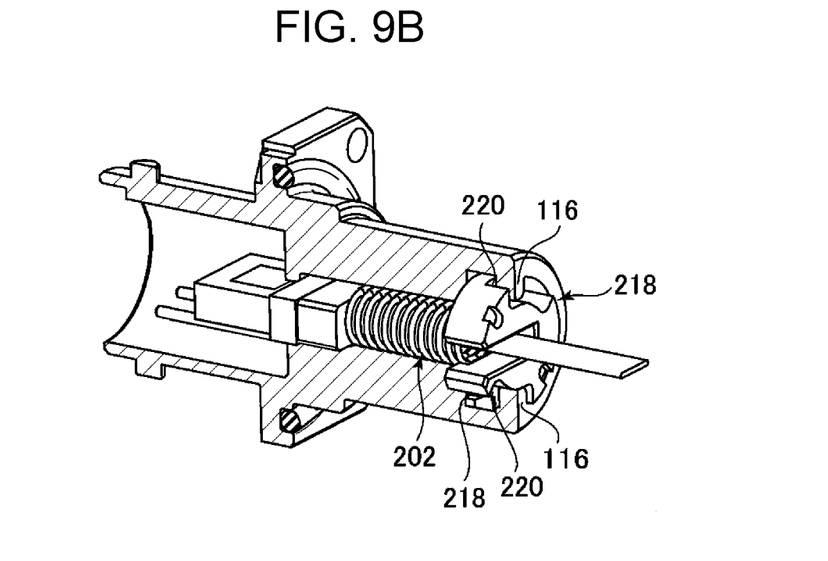

FIGS. 9A and 9B show a state in which the pushing of the pushing member into the accommodation section from the state shown in FIGS. 8A and 8B is stopped, and the pushing member is mounted in an end portion of the optical connector. FIG. 9A shows a state in which the pushing member 200 is mounted in the end portion of the accommodation section 104. The pushing member 200 is subjected to a force that urges the pushing member 200 in a push-out direction by the coil spring 202 in the accommodation section 104, and is fixed to the end portion of the accommodation section 104.

FIG. 9B shows a state of the inside of the accommodation section 104 after the pushing member 200 has been mounted. The pushing member 200 is subjected to an elastic force of the coil spring 202, and the back surfaces of the retaining sections 116 are fixed by being pushed against the respective lock sections 220. Each lock protrusion 212 that has traversed the back surface of the corresponding retaining section 116 from the one side surface of the corresponding retaining section 116 to the other side surface of the corresponding retaining section 116 is such that the lock sections 220 and the lock protrusions 212 surround the back-surface sides of the retaining sections 116. When the optical connector 100 is twisted clockwise or counterclockwise with respect to the axial direction, the rotation caused by the twisting or the like of the optical connector 100 can be restricted as a result of the lock protrusions 212 on the lock sections 220 coming into contact with the retaining sections 116.

The optical connector according to the present invention can be used when connecting cables in, for example, an optical fiber cable laying construction.

What is claimed is:
1. An optical connector comprising:
   a ferrule that is connected to an optical fiber cable;
   a fitting section that holds a front end portion of the ferrule therein and that is fitted to a mating optical connector;
   an elastic member that is disposed at a back end portion of the ferrule;
   an accommodation section that accommodates the ferrule and the elastic member therein; and
   a pushing member that pushes the elastic member into the accommodation section and that is mounted in the accommodation section,
   wherein the accommodation section includes a retaining section that protrudes from an inner wall of the accommodation section,
   wherein the pushing member includes a lock section for receiving the retaining section,
   wherein, when the pushing member is mounted in the accommodation section, the lock section is fixed by being pushed against the retaining section by an elastic force of the elastic member accommodated in the accommodation section,
   wherein the pushing member includes a cutaway section that is formed by cutting out a portion of a side wall of the pushing member, and
   wherein the cutaway section is formed such that, when mounting the pushing member in the accommodation section, the retaining section and the cutaway section are aligned and the pushing member is pushed into the accommodation section to pass the retaining section through the cutaway section.

2. The optical connector according to claim 1, wherein the pushing member includes a lock protrusion that protrudes from an edge of the lock section facing the cutaway section,
   wherein the lock protrusion is formed so as to, when mounting the pushing member in the accommodation section, traverse the retaining section as a result of the retaining section passing through the cutaway section and the pushing member rotating from a state in which the pushing member contacts a surface in the accommodation section, and
   wherein, after the pushing member is mounted in the accommodation section, the lock protrusion comes into contact with the retaining section to restrict rotation of the pushing member.

3. The optical connector according to claim 1, wherein the pushing member includes a concave-shaped jig receiver that, when mounting the pushing member in an end portion of the accommodation section, receives a jig for rotating the pushing member.

4. The optical connector according to claim 1, wherein the pushing member includes a recessed section in a surface of the pushing member that contacts the elastic member, and
   wherein the recessed section holds an end portion of the elastic member and restricts displacement of the elastic member.

5. An optical connector comprising:
   a ferrule that is connected to an optical fiber cable;
   a fitting section that holds a front end portion of the ferrule therein and that is fitted to a mating optical connector;
   an elastic member that is disposed at a back end portion of the ferrule;
   an accommodation section that accommodates the ferrule and the elastic member therein; and
   a pushing member that pushes the elastic member into the accommodation section and that is mounted in the accommodation section,
   wherein the accommodation section includes a retaining section that protrudes from an inner wall of the accommodation section,
   wherein the pushing member includes a lock section for receiving the retaining section,
   wherein, when the pushing member is mounted in the accommodation section, the lock section is fixed by being pushed against the retaining section by an elastic force of the elastic member accommodated in the accommodation section, and
   wherein the pushing member includes a concave-shaped jig receiver that, when mounting the pushing member in an end portion of the accommodation section, receives a jig for rotating the pushing member.

6. An optical connector comprising:
   a ferrule that is connected to an optical fiber cable;
   a fitting section that holds a front end portion of the ferrule therein and that is fitted to a mating optical connector;
   an elastic member that is disposed at a back end portion of the ferrule;
   an accommodation section that accommodates the ferrule and the elastic member therein; and
   a pushing member that pushes the elastic member into the accommodation section and that is mounted in the accommodation section,
   wherein the accommodation section includes a retaining section that protrudes from an inner wall of the accommodation section,
   wherein the pushing member includes a lock section for receiving the retaining section,
   wherein, when the pushing member is mounted in the accommodation section, the lock section is fixed by being pushed against the retaining section by an elastic force of the elastic member accommodated in the accommodation section, and
   wherein the pushing member includes a recessed section in a surface of the pushing member that contacts the elastic member, and
   wherein the recessed section holds an end portion of the elastic member and restricts displacement of the elastic member.

* * * * *